United States Patent
Vlaiko et al.

(10) Patent No.: US 12,417,030 B2
(45) Date of Patent: Sep. 16, 2025

(54) TOGGLE MODE INTERFACE FOR DATA INTEGRITY PROTECTION

(71) Applicant: SANDISK TECHNOLOGIES, INC., Milpitas, CA (US)

(72) Inventors: Julian Vlaiko, Kfar Saba (IL); Siddhesh Darne, Milpitas, CA (US); Hanan Borukhov, Rehovot (IL); Venky Ramachandra, San Jose, CA (US); Grishma Shah, San Jose, CA (US); Dmitry Vaysman, San Jose, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 377 days.

(21) Appl. No.: 17/933,823

(22) Filed: Sep. 20, 2022

(65) Prior Publication Data
US 2024/0094919 A1   Mar. 21, 2024

(51) Int. Cl.
*G06F 3/06* (2006.01)
(52) U.S. Cl.
CPC .......... *G06F 3/0619* (2013.01); *G06F 3/0653* (2013.01); *G06F 3/0679* (2013.01)
(58) Field of Classification Search
CPC ..... G06F 3/0679; G06F 3/0653; G06F 3/0619
See application file for complete search history.

(56) References Cited

U.S. PATENT DOCUMENTS

| | | | |
|---|---|---|---|
| 8,645,790 B2 | 2/2014 | Lee et al. | |
| 8,677,211 B2 | 3/2014 | Bandholz | |
| 10,795,759 B2 | 10/2020 | Riho et al. | |
| 10,951,232 B2 | 3/2021 | Kwak | |
| 11,422,888 B2 * | 8/2022 | Hsieh | G06F 11/0772 |
| 2015/0309742 A1 * | 10/2015 | Amidi | G06F 9/30 714/773 |
| 2021/0012852 A1 | 1/2021 | Tanaka et al. | |
| 2021/0042189 A1 | 2/2021 | Whately et al. | |

\* cited by examiner

*Primary Examiner* — Mark D Featherstone
(74) *Attorney, Agent, or Firm* — Patterson + Sheridan, LLP

(57) ABSTRACT

Aspects of a storage device including a memory and a controller are provided, which allow for error detection or data integrity checking during data transfer of write operations and read operations. The controller may be configured to generate data integrity information based on at least one data byte to be written to the memory, and to transfer the at least one data byte contemporaneously with the data integrity information on separate data paths to the memory. The controller may be configured to select between transferring data bus inversion information or the data integrity information based on whether a data integrity protection mode is active between the memory and the controller. The memory may be configured to receive the at least one data byte and the data integrity information from the controller, and detect whether an error exists in the at least one data byte based on the data integrity information.

16 Claims, 8 Drawing Sheets

TOGGLE MODE INTERFACE FOR DATA INTEGRITY PROTECTION

BACKGROUND

Field

This disclosure is generally related to electronic devices and more particularly to storage devices.

Background

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

A flash storage device may include multiple dies, each of which may include a block of memory. Various operations can be executed with the flash storage device. Examples of such operations include write operations and read operations. For a write operation, data may be written in one or more blocks of memory of one or more dies. For a read operation, data may be retrieved from one or more blocks or memory of one or more dies.

In some instances, execution of one operation may fail and/or produce an error, potentially leading to loss and/or corruption of data. For example, one or more data bits may be erroneously flipped at some point during transfer of the data bits during a write operation. Similarly, one or more data bits may be erroneously flipped at some point during retrieval of the data bits during a read operation. According to implementations of flash storage devices, corrupted data is unable to be detected until the data is completely written to memory and later retrieved from the block(s) of memory of die(s).

SUMMARY

The present disclosure describes various aspects of storage devices that each is configured to detect errors in data when data is written to memory, such as errors that may occur during the transfer of data to memory during a write or program operation. Accordingly, the present disclosure provides various techniques and solutions to maintaining the integrity of data when the data is to be programmed into memory.

One aspect of a storage device is disclosed herein. The storage device includes a memory and a controller. The controller is configured to generate first data integrity information based on at least one write data byte to be written to the memory, and transfer the at least one write data byte contemporaneously with the first data integrity information on separate data paths to the memory.

Another aspect of a storage device is disclosed herein. The storage device includes a memory and a controller. The controller is configured to receive at least one write data byte to be written to the memory. The controller is also configured to receive first data integrity information from the controller, in which the at least one write data byte and the first data integrity information are received contemporaneously on separate data paths between the controller and the memory. The controller is also configured to detect whether an error exists in the at least one write data byte based on the first data integrity information, and write the at least one write data byte into the memory in response to detecting that the error does not exist in the at least one write data byte.

A further aspect of a storage device is disclosed herein. The storage device includes a memory and controller. The controller may include a data integrity generator circuit connected to the memory and a data integrity check circuit connected to the memory. The data integrity generator circuit is configured to generate first data integrity information based on at least one write data byte to be written to the memory, and transfer the at least one write data byte contemporaneously with the first data integrity information on separate data paths to the memory. The data integrity check circuit is configured to receive at least one read data byte that is read from the memory, receive second data integrity information from the memory, and detect whether an error exists in the at least one read data byte based on the second data integrity information.

It is understood that other aspects of the storage device and method will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present disclosure will now be presented in the detailed description by way of example, and not by way of limitation, with reference to the accompanying drawings, wherein.

DETAILED DESCRIPTION

Figure 1:
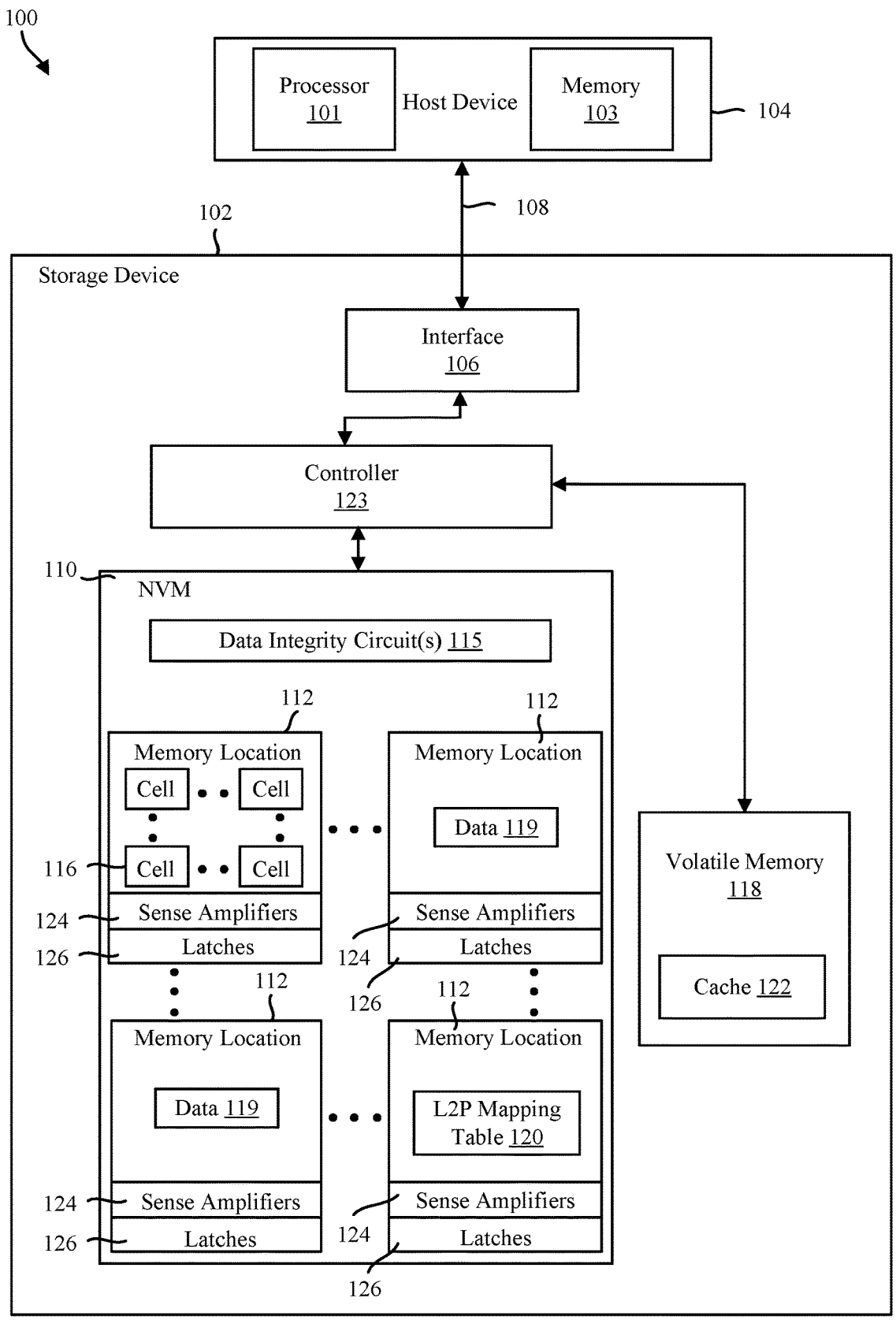
FIG. 1 is a block diagram illustrating an exemplary implementation of a storage device in communication with a host device.

The detailed description set forth below in connection with the appended drawings is intended as a description of various exemplary implementations of the present disclosure and is not intended to represent the only implementations in which the present disclosure may be practiced. The detailed description includes specific details for the purpose of providing a thorough understanding of the present disclosure. However, it will be apparent to those skilled in the art that the present disclosure may be practiced without these specific details. In some instances, well-known structures and components are shown in block diagram form in order to avoid obscuring the concepts of the present disclosure. Acronyms and other descriptive terminology may be used merely for convenience and clarity and are not intended to limit the scope of the disclosure.

The words "exemplary" and "example" are used herein to mean serving as an example, instance, or illustration. Any exemplary implementation described herein as "exemplary" is not necessarily to be construed as preferred or advantageous over other exemplary implementations. Likewise, the term "exemplary implementation" of an apparatus, method or article of manufacture does not require that all exemplary implementations of the disclosure include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present disclosure, with the understanding that such aspects may have a wide range of applications without departing from the spirit and scope of the present disclosure.

A storage device of the present disclosure generally includes multiple dies, with each die being a separate section of memory. For example, a storage device may include a NAND flash chip having multiple dies. The multiple dies may be connected to a controller via at least one bus, which may allow the controller and the multiple dies to communicate.

To interface, each die may be individually connected on a channel to the controller. Data transferred between the controller and each die may be carried on a respective channel. Accordingly, each of the channels may have a set of signals associated with the communication between the controller and a respective one of the dies. Signals may be assigned their functionalities according to the pins on which the signals are transmitted. In other words, a "first control" signal may be assigned to indicate "first control" information by virtue of the fact the "first control" signal is transmitted on a "first control" pin.

Examples of such signals include address latch enable (ALE), chip enable (CEn), command latch enable (CLE), input/output (I/O), data strobe (DSQ) signals, and/or other/ different signals. Illustratively, ALE signals may load addresses into an address registers, CEn signals may enable or disable one or more dies (e.g., logical unit numbers (LUNs)), CLE signals may load commands into a command register, I/O signals (e.g., Toggle Mode (TM) signals) may bi-directionally transfer data (and potentially address and/or command information), and DQS signals may provide synchronous reference for data input and output.

Further, some channels may have a data bus inversion (DBI) signal. For example, the controller may include a DBI pin to output a DBI signal, and a die may include a corresponding DBI pin at which the DBI signal is received as input. When data is received from a host device for a write operation, a signal may be sent from the controller to the DBI pin of each of the dies to which data is to be written.

According to some implementations of some flash devices, a DBI signal may be sent when data is to be transferred to one of the dies. In particular, the DBI signal may be used for comparing a byte of data and its inverse with a prior byte of data to see which option (inverted or not-inverted) provides fewer changed (or flipped) bits. The option providing fewer flipped bits is used and an additional bit may indicate whether the data word was flipped or not. For example, one byte of data (e.g., 11111111) and its inverse (e.g., 00000000) may be compared with a prior one byte of data (e.g., 00001010) and the inverted option may be selected because it results in two changed bits (or flipped bits) instead of six.

As the speed of a bus on which data is transferred between a controller and a set of dies increases, and as the number of dies operating increases, the probability of a higher bit error rate (BER) may commensurately increase at the interface between the controller and the dies. However, storage devices may lack mechanisms for data integrity checking at such an interface; consequently, data to be written on a die may be lost or corrupted on the interface during write data transfers, but such loss or corruption would be go undetected until the controller reads such data and regards the data loss or corruption as a problem (e.g., bit corruption) with the die. Furthermore, as the amount of data transferred across the interface between the controller and the dies increases, the circuitry for the data integrity checking becomes more complex and the integrity checking latencies increase.

Moreover, the increase in speed of a TM interface (i.e., the bus) between a NAND die and the controller reduces the signal integrity margin, which in turn effectively increases the probability for errors. Errors specifically in the write path eventually cause hard errors being programmed into the NAND die. Hard NAND errors considerably reduce the effectiveness of a low-density parity-check (LDPC) decoder, thus adversely impacting data retention and potentially resulting in customer data loss.

To address this concern, in one legacy approach, data bytes are transmitted over the TM interface followed by one or more CRC data bytes. This approach may yield the same integrity result, but instead loses a proportional TM interface bandwidth according to a ratio of CRC bytes to data bytes. For example, transferring 2 bytes of CRC information for every 16 bytes of data may yield a loss of about one-eighth of the effective TM interface bandwidth, which translates into a lower host-perceived performance given that the system performance is limited to the TM interface.

In another legacy approach, a parity bit is transmitted instead of DBI information over the same DBI signal. However, the parity for each byte of data has a low hamming distance and the overall integrity is compromised for isolated burst errors (e.g., a parity bit has about 50% chance to be correct or incorrect).

The present disclosure provides for utilizing the DBI signal to transfer (or send) a serial CRC bitstream that accompanies a block of data bytes. The data bytes are transferred on the TM interface without any modification. The CRC word is serialized at the transmitter and transferred over the DBI interface. On the receiver side, the CRC is de-serialized and used to check the received data. The CRC and the data block may or may not be in phase as far as the TM interface is concerned. In some aspects, the CRC may be pre-calculated at the transmitter to generate a number of clock cycles for transferring the data along with transferring the serial CRC bitstream over the DBI interface with a number of clock cycles that corresponds to the amount of data bytes being transferred.

According to various aspects of the present disclosure, a DBI pin may be configured (or implemented) according to a TM scheme to carry a signal on the data path, in addition or in alternative to, a configuration (or implementation) to carry a DBI signal on a serial data path (hereinafter referred to as "TM DBI pin"). Specifically, the present disclosure describes implementations of storage devices in which at least one pin is used to carry data integrity information during data transfers of write operations or read operations. For example, the TM DBI pin may be repurposed (or reused) as a bidirectional pin to carry data integrity information during data transfers of write operations from the controller to the NAND dies and carry data integrity information during data transfers of read operations from the NAND dies to the controller.

In some implementations, a DBI pin may be configured to carry a cyclic redundancy check (CRC) bit associated with at least one byte of data in a write operation. For example, a controller may generate a CRC bit based on at least one byte of data, and the controller may then send the CRC bit with the at least one byte of data to a die during the transfer phase of the write operation. Correspondingly, the die may receive the at least one byte of data (e.g., on an TM data pin) and the CRC bit, with the CRC bit being received on a DBI pin.

In other implementations, the TM DBI pin may be configured to carry a CRC bit associated with at least one byte of data in a read operation. For example, a CRC generator at the NAND may generate a CRC bit based on at least one byte of data that is read from a NAND die, and the CRC generator may then send the CRC bit with the at least one byte of data to the controller during the transfer phase of the read operation. Correspondingly, the controller may receive the at least one byte of data (e.g., on the TM data pin) and the CRC bit, with the CRC bit being received on the DBI pin.

By repurposing (or reusing) a TM DBI pin to carry data integrity information, such as CRC information, when data to be written to a die is received from a controller on an interface during transfer phases of write operations, data integrity can be checked during transfer phases of write operations. Similarly, by repurposing the TM DBI pin to carry the data integrity information when data is read from a die and received by a controller on an interface during transfer phases of read operations, the data integrity can be checked during the transfer phases of the read operations. Such data integrity checks may enable data loss or corruption on the interface (e.g., due to noise or other problems with a bus) to be detected before all data is written in the die. Accordingly, the present disclosure provides various techniques and solutions to checking data integrity during data transfer of write operations and read operations.

In one implementation, CRC information is used on both write and read paths accessing the NAND dies. In another implementation, the CRC information can be used only on the write path, where the CRC information is used to detect potential hard errors written to the NAND dies. On the read path, the DBI interface can be used to reduce power consumption on the TM interface, and additionally mitigate potential errors on the TM interface by a re-read operation and potential recalibration of the TM interface timing and/or operating frequency. In case of an error being detected at the NAND receiver side for a write operation, the controller (after writing to the NAND die) can check a special register in the NAND die that holds the CRC check status for a previous write operation. The NAND die can communicate the error to the controller via a control signal or by forcing an atypical behavior of a specific signal (e.g., shorting a receiving input to a very low pull down value) that can be detected at the transmitter side of the controller as an exception event.

Particular implementations of the subject technology described in the present disclosure can be implemented to realize one or more of the following potential advantages. By repurposing the DBI signal for transferring data integrity information can build upon a high data integrity capability that supports ever increasing data rates on both write and read paths on the TM interface. The method of repurposing the DBI signal for transferring data integrity information along with corresponding bytes of data can address the issue of short block buffering and restrictive processing power in NAND dies. For example, the subject technology can enable the transfer of CRC information in short block form (e.g., 16-byte block) at high TM data rates of multiples of gigabits-per-second (Gbps) to a NAND die by pipelining (or staggering) multiple data blocks and their respective CRC bytes. Additionally, by protecting the NAND interface read path by CRC, the memory controller can quickly determine if there is an issue with the TM interface timing, can shorten the recovery path and also provide hints into the LDPC operation (e.g., ultra-low power (ULP) decoder operations skipped in case of CRC errors).

FIG. 1 shows an exemplary block diagram 100 of a storage device 102 which communicates with a host device 104 (also "host") according to an exemplary implementation. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other implementations may be integrated into the storage device 102, in whole or in part. Additionally or alternatively, the host 104 may be distributed across multiple remote entities, in its entirety, or with some functionality in the storage device 102.

Those of ordinary skill in the art will appreciate that other exemplary implementations can include more or less than those elements shown in FIG. 1 and that the disclosed processes can be implemented in other environments. For example, other exemplary implementations can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive RAM (ReRAM) devices, magnetoresistive RAM (MRAM) devices, ferroelectric random-access memory (F-RAM), and any other type of non-volatile memory devices. In other examples, the host memory 103 may include volatile memory, such as RAM, dynamic RAM (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Additionally or alternatively, the host interface 106 may be wireless, and may interface the storage device 102 with the host 104 using, for example, cellular communication (e.g., 5G NR, 4G LTE, 3G, 2G, GSM/UMTS, CDMA One/CDMA2000, etc.), wireless distribution methods through access points (e.g., IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

As shown in the exemplary implementation of FIG. 1, the storage device 102 includes non-volatile memory (NVM) 110 for non-volatilely storing data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the illustrated exemplary implementation of FIG. 1, each memory location 112 may be a block including multiple cells 116. The cells 116 may be single-level cells, multi-level cells, triple-level cells, quad-level cells, and/or penta-level cells, for example. Other examples of memory locations 112 are possible; for instance, each memory location may be a die containing multiple blocks. Moreover, each memory location may include one or more blocks in a 3-D NAND array. Moreover, the illustrated memory locations 112 may be logical blocks which are mapped to one or more physical blocks.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g., NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. In some implementations, the L2P mapping table 120 may be loaded into volatile memory 118 (e.g., from the NVM 110). The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
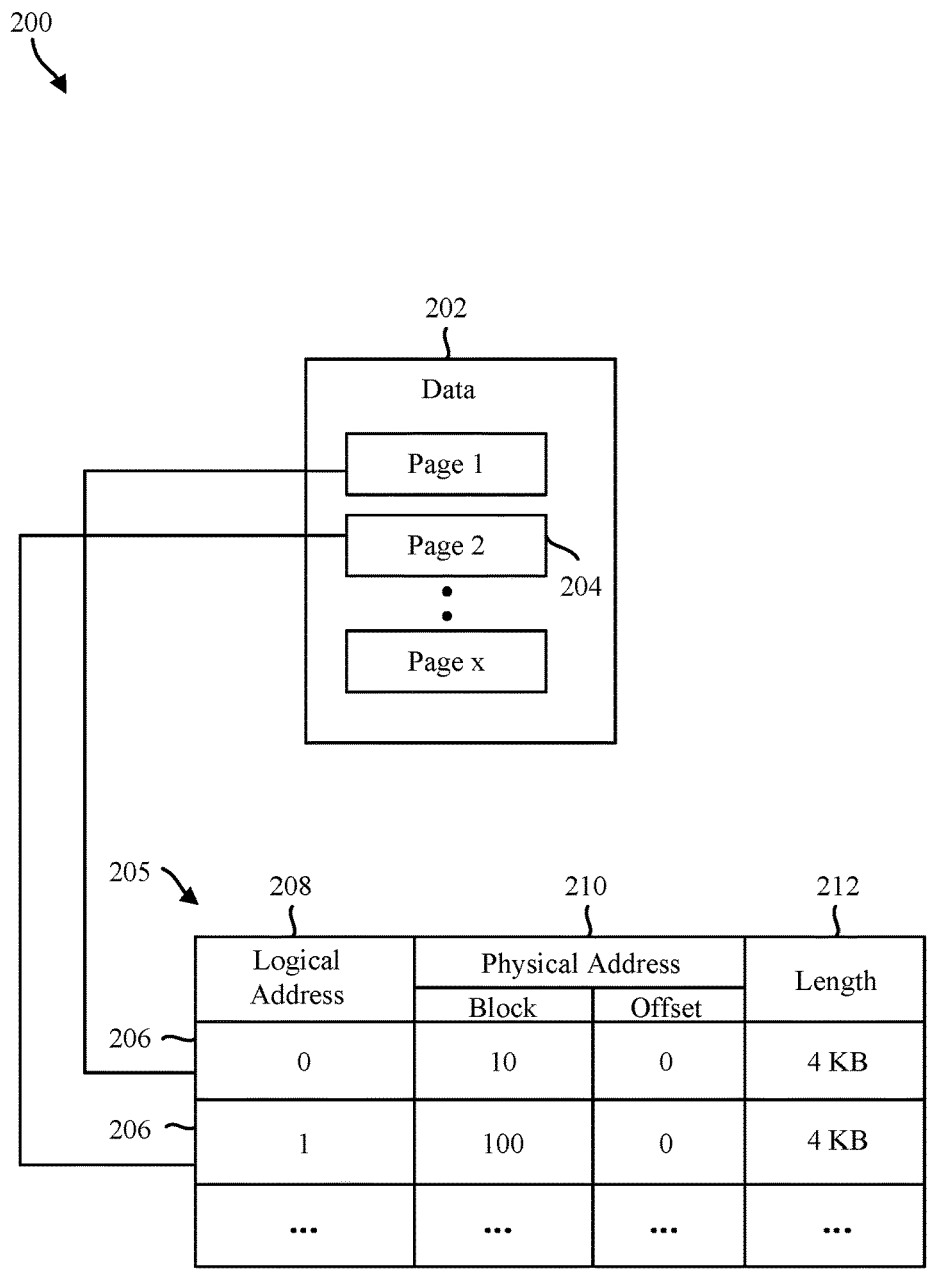
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary implementation, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data, e.g., 4 kilobytes (KB) or some other size.

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g., it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g., readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), FPGA, hard-wired logic, analog circuitry, and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g., translate the logical addresses into physical addresses), and access or store data in the cells 116 located at the mapped physical addresses.

The controller 123 and its components may be implemented with embedded software that performs the various functions of the controller described throughout this disclosure. Additionally or alternatively, software for implementing each of the aforementioned functions and components may be stored in the NVM 110 or in a memory external to the storage device 102 or host device 104, and may be accessed by the controller 123 for execution by the one or more processors of the controller 123. Additionally or alternatively, the functions and/or components of the controller may be implemented with hardware and/or firmware in the controller 123, or may be implemented using a combination of the aforementioned hardware, firmware, and/or software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

In some implementations, the storage device 102 includes at least one data integrity circuit(s) 115, which may be connected to and/or integrated (or implemented) with the NVM 110. While the data integrity circuit(s) 115 are illustrated as within NVM 110, in some other implementations, at least one data integrity circuit may be implemented outside of NVM 110 or implemented within one of the memory locations 112. In some implementations, the controller 123 may include at least one data integrity circuit(s) 115 in addition to the NVM 110 being integrated with (or connected to) at least one other data integrity circuit(s) 115.

The data integrity circuit(s) 115 and its components may be implemented with embedded software, hardware, and/or firmware that performs one or more functions for the NVM 110 described throughout this disclosure. For example, at least one data integrity circuit(s) 115 may include gates, logic, and/or other such circuit configured to perform the various operations described herein. In another example, at least one data integrity circuit(s) 115 may include a processor.

In some implementations, the at least one data integrity circuit(s) 115 may include software, hardware, and/or firmware at each of the memory locations 112; accordingly, each of the data integrity circuit(s) 115 may be configured to perform various functionality for a respective one of the memory locations 112. For example, a respective one of the data integrity circuit(s) 115 may communicate signals and execute operations with the controller 123.

The controller 123 may communicate with the memory locations 112, e.g., through the data integrity circuit(s) 115, via an interface. For example, the controller 123 may communicate with the data integrity circuit(s) 115 via the interface on a bus (collectively referred to herein as "bus/interface"). By way of illustration and not limitation, the interface and/or bus may be configured according to Toggle Mode. However, other configurations are possible without departing from the scope of the present disclosure.

The controller 123 may communicate with the memory locations 112 in parallel or asynchronously. Potentially, errors (e.g., as measured by BER) may occur in data on the bus and/or interface during communication between the controller 123 and the memory locations 112. In particular, "errors" may refer to flipped and/or undetected bits, which may occur due to noise on the bus and/or other factors. For example, as speed on the bus increases and/or the number of memory locations 112 with which the controller 123 communicates increases, the BER may likewise increase. Without error detection or data checking of data transferred on the bus/interface, errors occurring on the bus/interface during data transfer may be undetected until a later time, at which point the source or the errors may be undiscoverable.

Illustratively, the controller 123 may receive a request from the host 104 to write data to the NVM 110. The controller 123 may execute a write operation so that the data is programmed into one or more of the memory locations 112 (e.g., cells) and, in so doing, the controller 123 may transfer the data over the bus/interface to the NVM 110. If one or more errors were to occur on the bus/interface during data transfer of the write operation, such one or more errors may be written to the one or more memory locations 112 unless detected or checked.

Absent error detection or checking, the errors in the data written in the memory locations 112 may remain undetected until the controller 123 receives a request from the host 104 to read the data from the NVM 110, at which point the controller 123 may detect the errors and inaccurately attribute them to the memory locations 112 (e.g., as bit corruption errors). Such inaccurate attribution may cause unnecessary, and therefore inefficient, operations (e.g., exception or error handling) to occur, such as by marking some blocks in the memory locations 112 as "bad" (e.g., so that the marked blocks are avoided during writes) when those blocks may not, in fact, have caused the errors when reading the data.

Therefore, the storage device 102 may be configured to perform error detection or data integrity checking during transfer of data to each of the memory locations 112 when a write operation is executed. To do so, the controller 123 may be configured to generate data integrity information based on at least one byte of data to be written to a respective one of the memory locations 112. Similarly, the storage device 102 may be configured to perform the error detection during transfer of data from each of the memory locations 112 when a read operation is executed. To do so, the memory locations 112 may be configured to generate data integrity information based on at least one data byte of data that is read from a respective one of the memory locations 112. For example, the data integrity information may include at least one CRC bit or may include at least one CRC byte.

The controller 123 may be further configured to transfer the at least one byte of data and the data integrity information to the respective one of the memory locations 112 on the bus/interface. Specifically, the controller 123 may transfer the at least one byte of data on an I/O output (e.g., data bus and/or pin) to the respective one of the memory locations 112, whereas the controller 123 may transfer the data integrity information on at least one output (e.g., a pin mapped to DBI) to the respective one of the memory locations 112.

Correspondingly, the data integrity circuit(s) 115 may be configured to receive the at least one byte of data and the data integrity information from the controller 123 on the bus/interface for the respective one of the memory locations 112. In particular, the data integrity circuit(s) 115 may receive the at least one byte of data on a TM data input (e.g., data bus and/or pin) of the respective one of the memory locations 112, and may receive the data integrity information on at least one input (e.g., a pin mapped to DBI) of the respective one of the memory locations 112.

The data integrity circuit(s) 115 may then buffer the at least one byte of data, e.g., in volatile memory 118, while determining whether an error has occurred during transfer of the at least one byte of data on the bus/interface based on the data integrity information. In some implementations, the data integrity circuit(s) 115 may perform error detection or data integrity checking using the data integrity information "on-the-fly," after which point the data integrity circuit(s) 115 may refrain from storing or buffering the data integrity information. For example, the data integrity circuit(s) 115 may receive the at least one byte of data and dynamically perform error detection or data integrity checking using the data integrity information as the at least one byte of data is received.

If the data integrity circuit(s) 115 determines that no errors have been detected in the at least one byte of data, then the data integrity circuit(s) 115 may program the buffered at least one byte of data in the respective one of the memory locations 112 (e.g., in one or more cells 116). However, if the data integrity circuit(s) 115 determines that an error is detected in the at least one byte of data based on the data integrity information, then the data integrity circuit(s) 115 may indicate the detected error to the controller 123, such as by sending a write error response to a "status read" register with a "check write" command or as a "program" command. In response to receiving the write error response, e.g., on a "status read" register with "check write" command or a "program" command, the controller 123 may resend and/or reschedule the at least one data byte for transfer over the bus/interface to the respective one of the memory locations 112. In some aspects, the data integrity circuit 115 may refrain from programming the buffered at least one byte of data in the respective one of the memory locations 112 when the data integrity circuit 115 determines that an error is detected in the at least one byte of data to be written.

Additional and/or further implementations of such error detection or data integrity checking during data transfer of write operations and read operations are described herein.

Figure 3:
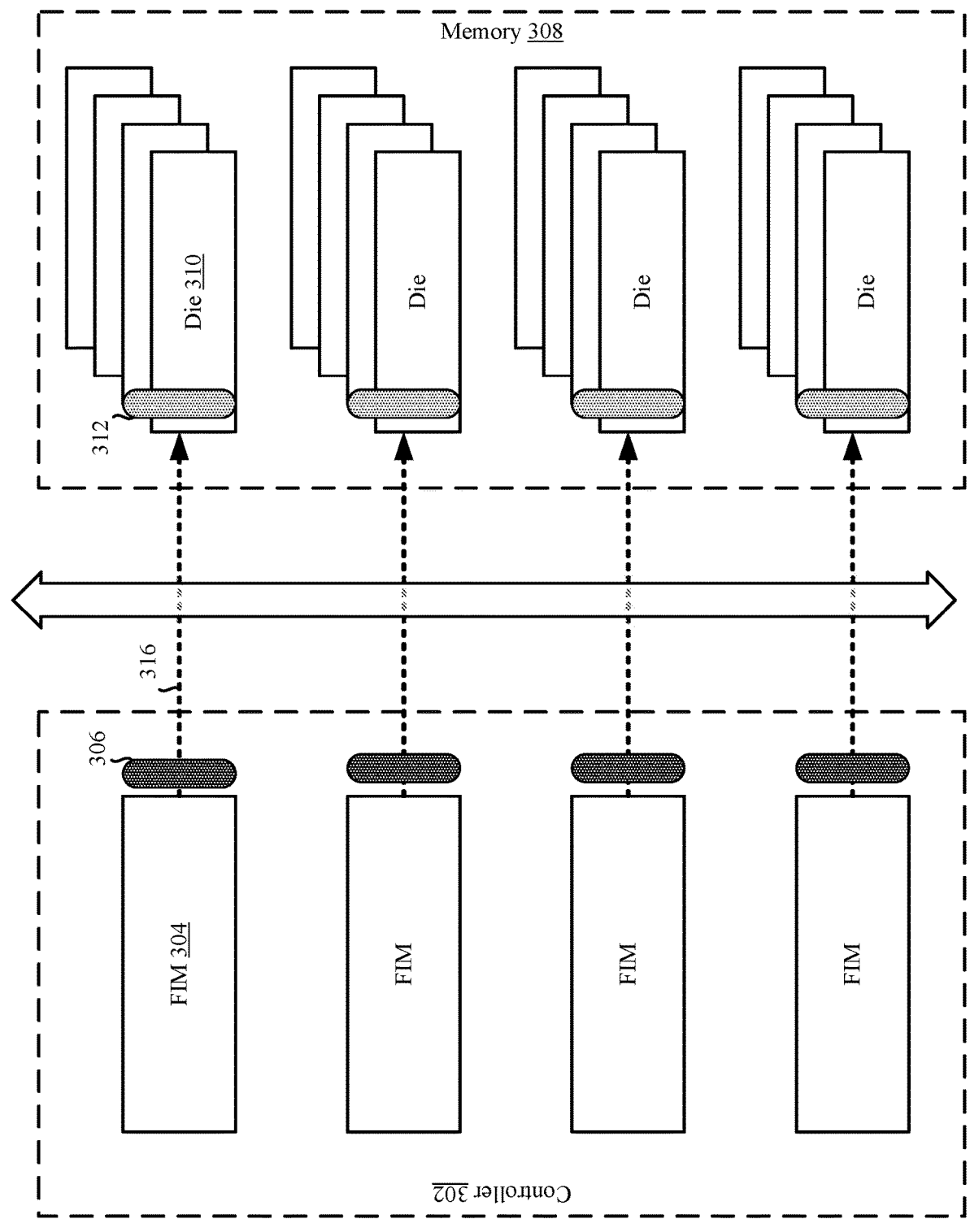
FIG. 3 is a conceptual diagram illustrating an example of a storage device configured to generate and check data integrity information for data transfer of write operations and read operations.

FIG. 3 is a conceptual diagram 300 illustrating an example of a controller 302 in communication with a memory 308. In the context of FIG. 1, for example, the controller 302 may be implemented as the controller 123, the memory 308 may be implemented as the NVM 110 (e.g., including or connected with the data integrity circuit(s) 115), and each die 310 may be implemented as one of the memory locations 112 (e.g., including or connected with the data integrity circuit(s) 115). In some other examples, however, the controller 302 and/or memory 308 may be implemented in another apparatus or may individually standalone as separate components outside of an apparatus.

As shown in FIG. 3, a storage device may include a controller 302 having a set of flash interface modules (FIMs), which may work in parallel or asynchronously with one other, e.g., to read and/or write data to the memory 308. The storage device may further include the memory 308 having a set of dies, and correspondingly, the dies may communicate with the FIMs.

The FIMs and the dies may be connected over a respective channel. For example, a representative channel 316 may be a bus or other interface, such as a TM bus. Illustratively, a representative FIM 304 may communicate with a representative die 310 via the channel 316.

The FIM 304 may be configured to execute operations in the die 310. For example, the FIM 304 may send signals to the die 310 on the channel 316 to read data, write data, erase data, and/or some other operations.

When the FIM 304 executes a write operation to write data in the die 310, the FIM 304 may transfer (or send) the data to the die 310 on the channel 316 (e.g., a write channel). Correspondingly, the die 310 may receive the data from the FIM 304 on the channel 316. Conversely, when the FIM 304 executes a read operation to read data in the die 310, the die 310 may transfer (or send) the data to the FIM 304 on the channel 315 (e.g., a read channel). Correspondingly, the FIM 304 may receive the data from the die 310 on the channel 316.

In order to implement error detection or data integrity checking during transfer of data on the channel 316, the FIM 304 may include or may be connected with an integrity information generator 306, which may be software, hardware, firmware or some combination thereof. When the FIM 304 is to write data (e.g., at least one byte of data) in the die 310, the FIM 304 may send the data through the integrity information generator 306, and the data may then be transferred to the die 310 on the channel 316.

The integrity information generator 306 may be configured to generate data integrity information based on the data. In some aspects, for example, the integrity information generator 306 may include an algorithm that outputs the data integrity information, which may be referred to as a "data integrity algorithm." Illustratively, the FIM 304 may pass the data to the integrity information generator 306 as an input, and the integrity information generator 306 may output the data integrity information with the data so that the data is transferred to the die 310 with the data integrity information.

In some other implementations, the data integrity information may include a set of bits—e.g., the data integrity information may include at least one byte. For example, the integrity information generator 306 may include a CRC algorithm as the data integrity algorithm. A CRC algorithm may generate the set of bits for the data integrity information based on inputting the at least one byte of data, such as a checksum algorithm, hashing algorithm, or other similar algorithm in which the data integrity information includes redundant data from the at least one byte of data. In other words, the data integrity information may include redundancy bits encoded from the at least one byte of data. Different CRC algorithms may be possible without departing from the scope of the present disclosure.

When the controller 302 executes a write operation so that the at least one byte of data is transferred across the bus to the memory 308, the channel 316 may carry bits (and bytes) from a set of outputs at the FIM 304 (which may be set by the integrity information generator 306) to a set of inputs at the die 310. In particular, the FIM 304 may include at least a TM data output and a TM DBI output, which may be connected with a TM data input and a TM DBI input, respectively, included at the die 310.

The FIM 304 may transfer the at least one byte of data for the write operation at the TM data output. Correspondingly, the die 310 may receive the at least one byte of data at the TM data input. In some implementations, however, the FIM 304 (or integrity information generator 306) may transfer the data integrity information that is based on the at least one byte of data at the TM DBI output, and therefore, the die 310 may receive the data integrity information at the TM DBI input. Thus, the controller 302 may transfer the at least one byte of data with the data integrity information to the memory 308; although, the at least one byte of data may be a different signal (e.g., on a different pin) than the data integrity information.

As the data integrity information may be sent on a TM DBI output and received on a TM DBI input, the controller 302 may configure the TM DBI output to carry data integrity information, e.g., instead of or in addition to DBI signals. For example, the controller 302 may configure FIM 304 to send data integrity information on the TM DBI output on a data path with data bytes also on the data path, e.g., instead of or in addition to sending a DBI signal on the TM DBI output.

To that end, the controller 302 may configure the memory 308 for error detection or data integrity checking during data transfer of write operations by configuring the die 310 to detect for the data integrity information on the TM DBI input when at least one byte of data is being transferred on the TM data input. In some implementations, FIM 304 may transmit an indication (e.g., a signal) that the signals received on the TM DBI input (e.g., during data transfer of a write operation) are for error detection for bytes of data received on the TM data input. Accordingly, the die 310 may continue to detect signals on the TM DBI input during transfer of bytes of data received on the TM data input, and the die 310 may use those signals detected on the TM DBI input during data transfer as the data integrity information for the data bytes.

The set of inputs at the die 310 may pass through a integrity information checker 312, which may be included in or connected to the die 310 and may be implemented as software, hardware, firmware, or some combination thereof. The integrity information checker 312 may be configured to detect whether there is at least one error in the at least one byte of data based on the data integrity information. In some aspects, the at least one byte of data may be held in a buffer, rather than directly written in the die 310. In other aspects, the at least one byte of data may be directly written in the die 310.

Similar to the integrity information generator 306, the integrity information checker 312 may be configured with an algorithm with which the integrity information checker 312 may detect for errors in the at least one byte of data transferred over the channel 316. In some implementations, when the data integrity information includes a CRC bit or a CRC byte, the integrity information checker 312 may include a CRC algorithm, which may be configured similarly to the integrity information generator 306 (e.g., configured for calculating a checksum).

Subsequently, the integrity information checker 312 may obtain the expected information as an output of the CRC algorithm, and may compare the expected information with the data integrity information. If the integrity information checker 312 determines that the expected information matches the data integrity information, then the integrity information checker 312 may determine that no errors occurred in the data transfer of the write operation. Accordingly, the at least one byte of data may be programmed from the buffer into the die 310.

If the integrity information checker 312 determines that the expected information does not match the data integrity information, then the integrity information checker 312 may determine that an error occurred in the data transfer of the write operation. In response to detecting the error in the data transfer based on the data integrity information, then the die 310 may send a write error response to the FIM 304. For example, the die 310 may send the write error response as "status read" with "check write" command or a "program" command. In some aspects, the die 310 may refrain from programming the at least one byte of data from the buffer into the die 310 when the integrity information checker 312 determines that an error in the at least one byte of data is detected. In response to receiving the write error response, the FIM 304 may retransfer (and/or reschedule) the at least one byte of data in order to reattempt a successful transfer of the at least one byte of data for the write operation.

In some implementations, the integrity information generator 306 and integrity information checker 312 may be preconfigured with the aforementioned algorithms. In some other implementations, the controller 302 may configure the memory 308 with a suitable algorithm corresponding to the algorithm implemented at the controller side. For example, the FIM 304 may transmit information indicating which algorithm the integrity information generator 306 is to use to generate the data integrity information that will be transferred with the data bytes during write operations. Illustratively, such information may indicate whether a CRC bit is to be used for error detection of the data bytes, whether the data integrity information includes a CRC byte for one or more data bytes, and/or other information indicating how the error detection/data integrity checking is to be implemented through the data integrity information transferred with the data bytes.

The die 310 may then receive the information indicating which algorithm the integrity information generator 306 is to use to generate data integrity information. Accordingly, the integrity information checker 312 may be configured with a corresponding algorithm consistent with the information received from the FIM 304. That is, the integrity information generator 306 and the integrity information checker 312 may be configured with corresponding error detection/data integrity checking algorithms (e.g., CRC, checksum, hashing, or another such algorithm) so that the integrity information checker 312 may accurately detect erroneous bits in data bytes in response to receiving data integrity information with data bytes during data transfer of write operations or read operations.

Figure 4:
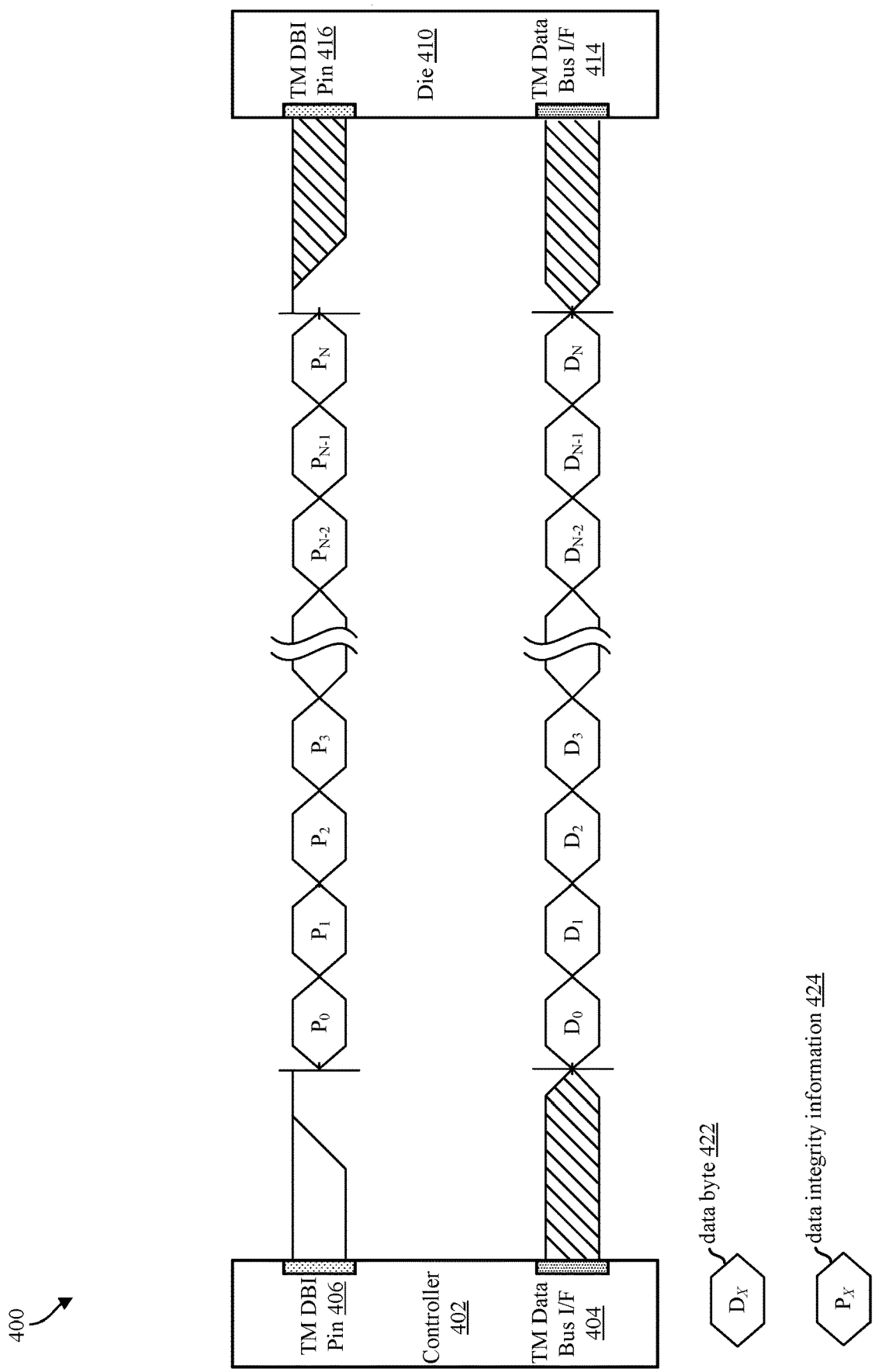
FIG. 4 is a conceptual diagram illustrating an example of a timing diagram for transferring data integrity information on a pin during transfer of data bytes on an input/output pin for write operations and read operations.

FIG. 4 is a conceptual diagram illustrating an example 400 of a timing diagram for transferring data integrity information on a TM DBI pin during transfer of data bytes on a TM data bus for a write operation or a read operation. In the context of FIGS. 1 and 3, the controller 402 may be implemented as the controller 123 and/or the controller 302, and the die 410 may be implemented as one of the NVM 110 (e.g., including or connected with the data integrity circuit(s) 115), the memory locations 112 (e.g., including or connected with the data integrity circuit(s) 115), the memory 308, and/or the die 310.

As illustrated, the controller 402 and the die 410 may each include a respective one of the TM data bus interfaces 404, 414 and a respective one of the TM DBI pins 406, 416. The TM data bus interfaces 404, 414 and the TM DBI pins 406, 416 may be respectively connected across a bus (e.g., the channel 316 of FIG. 3) and/or other interface. In some other implementations, the TM DBI pins 406, 416 may be implemented as a pair of connected pins configured to carry another signal different from the DBI. For example, the TM DBI pins 406, 416 may be implemented as an existing pair of connected pins (e.g., each of the TM DBI pins 406, 416 may be configured to carry redundant information for data on the TM data bus and/or as data integrity information for data on the TM data bus, either serially or in parallel and contemporaneous with corresponding data via the TM data bus interfaces 404, 414).

In some implementations, each of the TM data bus interface 404 at the controller 402 and TM data bus interface 414 at the die 410 may include multiple TM data pins, such as four pins, eight pins (e.g., one byte in parallel), or sixteen pins, e.g., such that data bits may be transferred in parallel on the data bus. It will be appreciated that the controller 402 may have multiple sets of TM data bus interfaces and TM DBI pins, each of the TM data bus interfaces and TM DBI pins may be connected with a respective die, e.g., similar to die 410, in order to transfer data between the controller 402 and multiple dies.

When the controller 402 has data to be programmed into memory, including the die 410, the controller 402 may execute a write operation. For example, the controller 402 may initialize the die 410 to receive data—e.g., the controller 402 may transmit a write enable signal to the die 410 that drives detection of data bytes via the TM data bus interface 414 of the die 410 when transferred via the TM data bus interface 404 of the controller 402 over the TM data bus.

As described, herein, however, the TM DBI pins 406, 416 may be repurposed (or reused) to communicate data integrity information that allow for error detection (or data integrity checking) of the data on the TM data bus interfaces 404, 414. Thus, the controller 402 may generate data integrity information 424 based on at least one data byte 422. The controller 402 may then transfer the data integrity information 424 with the at least one data byte 422 to the die. However, the at least one data byte 422 may be transferred on the TM data bus interface 404, whereas the data integrity information 424 may be transferred on the TM DBI pin 406.

Correspondingly, the die 410 may be configured to receive the at least one data byte 422 on the TM data bus interface 414 and receive the data integrity information on the TM DBI pin 416. The die 410 may then detect for errors in the at least one data byte 422 in response to receiving the data integrity information 424.

In some implementations, the data integrity information 424 may be implemented as a CRC bit. As illustrated, for example, the data integrity information 424 may be one CRC bit that is generated based on at least data byte 422 that is transferred with the data integrity information 424. For example, one CRC bit may correspond to one data byte 422. While FIG. 4 illustrates respective data integrity information 424 corresponding to a single data byte 422, respective data integrity information 424 potentially may correspond to more than one data byte without departing from the scope of the present disclosure (e.g., data integrity information can be generated and transferred with every two, three, four, etc. data bytes).

During transfer of either a write operation or a read operation, the data integrity information 424 may be serialized across the TM DBI pins 406, 416, whereas the at least one data byte 422 may be include eight bits in parallel across the TM data bus interfaces 404, 414. In some implementations, the data integrity information 424 may be a single bit that is toggled from across the TM DBI pins 406, 416 at the same clock rate as the data byte 422 across the TM data bus interfaces 404, 414. For example, during transfer of a write operation, the controller 402 may toggle (e.g., to either a 1 bit or a 0 bit) the signal across the TM DBI pins 406, 416 based on each data integrity information corresponding to at least one respective data byte. In another example, during transfer of a read operation, the die 410 may toggle (e.g., to either a 1 bit or a 0 bit) the signal across the TM DBI pins 406, 416 based on each data integrity information corresponding to at least one respective data byte.

As illustrated, the controller 402 may transfer a set of data bytes $D_0, D_1, \ldots, D_{N-1}, D_N$ to the die 410 during data transfer of a write operation. For at least one of the set of data bytes, the controller 402 may generate (e.g., on-the-fly) one of a set of data integrity information $P_0, P_1, \ldots, P_{N-1}, P_N$. When the controller 402 transfers a data byte 422 from the TM data bus interface 404, the controller 402 may also transfer data integrity information 424 from the TM DBI pin 406. For example, the controller 402 may transfer data bytes $D_0, D_1, \ldots, D_{N-1}, D_N$ from the TM data bus interface 404, and contemporaneous with a respective one of the data bytes $D_0, D_1, \ldots, D_{N-1}, D_N$, the controller 402 may also transfer a respective one of the data integrity information $P_0, P_1, \ldots, P_{N-1}, P_N$ from the TM DBI pin 406. In other words, in a window in which $D_0$ is transferred across the bus on TM data bus interface 404, $P_0$ is also transferred across the bus on TM DBI pin 406.

Correspondingly, die 410 may receive data bytes $D_0, D_1, \ldots, D_{N-1}, D_N$ at the TM data bus interface 414, and contemporaneous with a respective one of the data bytes $D_0, D_1, \ldots, D_{N-1}, D_N$, the die 410 may also receive a respective one of the data integrity information $P_0, P_1, \ldots, P_{N-1}, P_N$ at the TM DBI pin 416. In other words, in a window in which $D_0$ is received across the bus on TM data bus interface 414, $P_0$ is also received across the bus on TM DBI pin 416.

In some implementations, as the die 410 contemporaneously receives each of the data bytes $D_0, D_1, \ldots, D_{N-1}, D_N$ at the TM data bus interface 414 and each of the data integrity information $P_0, P_1, \ldots, P_{N-1}, P_N$ at the TM DBI pin 416, the die 410 may perform error detection for each of the data bytes $D_0, D_1, \ldots, D_{N-1}, D_N$ based on a respective one of the data integrity information $P_0, P_1, \ldots, P_{N-1}, P_N$. For example, when die 410 receives $D_0$ on TM data bus interface 414 and $P_0$ on DBI pin 416, the die 410 may generate (on-the-fly) an expected information based on $D_0$. The die 410 may then compare the expected information with $P_0$ to detect whether any errors are present in $D_0$. If no errors are detected (e.g., if the expected information is determined to match $P_0$), then the die 410 may program $D_0$ in the die 410 (e.g., in a block and/or cell).

However, if the die detects an error (e.g., if the expected information is determined to not match $P_0$), then the die 410 may flag the detected error in a register accessible to the controller 402 via the TM data bus interfaces 404, 414. For example, the controller 402 may request to read from the registers to determine whether any of the data bytes contained an error.

In some other implementations, and further in response to detecting an error, the die 410 may refrain from writing $D_0$ in the die 410, and instead may discard $D_0$ from the buffer in which it is temporarily located. The die 410 also may send a write error response to the controller 402. In response to receiving the write error response, the controller 402 may retransmit (or reschedule) $D_0$ or the controller 402 may retry (or reschedule) the write operation including all of the data bytes $D_0, D_1, \ldots, D_{N-1}, D_N$.

In still some other implementations, as the die 410 contemporaneously receives each of the data bytes $D_0, D_1, \ldots, D_{N-1}, D_N$ at the TM data bus interface 414 and each of the data integrity information $P_0, P_1, \ldots, P_{N-1}, P_N$ at the TM DBI pin 416, the die 410 may collect (e.g., buffer) the data integrity information $P_0, P_1, \ldots, P_{N-1}, P_N$ in order to recover multiple data integrity information CRC bytes. For example, the signals across the TM DBI pins 406, 416 may be toggled for each bit $P_0, P_1, \ldots, P_{N-1}, P_N$ of a CRC byte, and each of the multiple CRC bytes may correspond to some or all of the data bytes $D_0, D_1, \ldots, D_{N-1}, D_N$.

The die 410 may then use the bits $P_0, P_1, \ldots, P_{N-1}, P_N$ of a first CRC byte to detect an error in a first portion of a data block containing data bytes $D_0, D_1, \ldots, D_{N-1}, D_N$. The die 410 also may then use the bits $P_0, P_1, \ldots, P_{N-1}, P_N$ of a second CRC byte to detect an error in a second portion of the data block containing data bytes $D_{N+1}, D_{N+2}, \ldots, D_{(N+M)-1}, D_{N+M}$. If the die 410 detects an error based on the bits $P_0, P_1, \ldots, P_{N-1}, P_N$ of the first CRC byte, then the die 410 may flag the error in the data bytes $D_0, D_1, \ldots, D_{N-1}, D_N$ based on the bits $P_0, P_1, \ldots, P_{N-1}, P_N$ of the first CRC byte. Similarly, if the die 410 detects an error based on the bits $P_0, P_1, \ldots, P_{N-1}, P_N$ of the second CRC byte, then the die 410 may flag the error in the data bytes $D_{N+1}, D_{N+2}, \ldots, D_{(N+M)-1}, D_{N+M}$ based on the bits $P_0, P_1, \ldots, P_{N-1}, P_N$ of the second CRC byte. However, if the die 410 detects too many errors (e.g., more than one error), then the die 410 may refrain from writing the data bytes $D_0, D_1, \ldots, D_{N-1}, D_N, Dh_{N+1}, D_{N+2}, \ldots, D_{(N+M)-1}, D_{N+M}$ in the die 410, and instead may discard the data bytes $D_0, D_1, \ldots, D_{N-1}, D_N, D_{N+1}, D_N+2, \ldots, D_{(N+M)-1}, D_{N+M}$ from the buffer in which the data bytes are temporarily located. Further in response to detecting too many errors, the die 410 may send a write error response to the controller 402.

Figure 5:
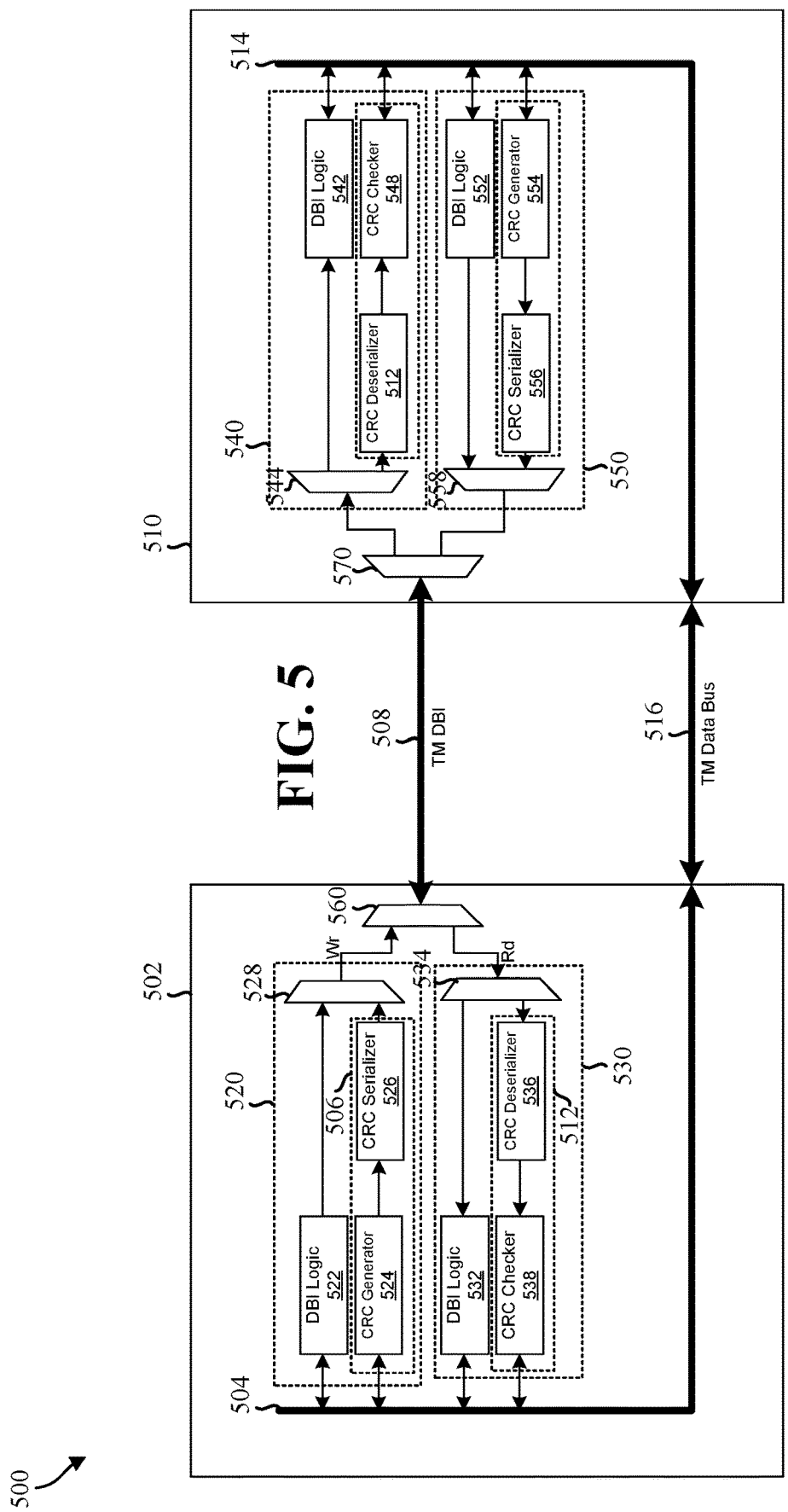
FIG. 5 is a conceptual diagram illustrating an example of a storage device configured to generate and check data integrity information for data transfer of write operations and read operations.

FIG. 5 is a conceptual diagram illustrating an example 500 of a storage device configured to generate and check data integrity information for data transfer of write operations and read operations. As shown in FIG. 5, a controller 502 in the storage device includes a transmitter 520 and a receiver 530, which may work in parallel or asynchronously with one other, e.g., to read and/or write data to the NAND die 510. The controller 502 also includes a controller multiplexer 560 that may be a combinational logic circuit that switches between a write path from the transmitter 520 or a read path to the receiver 530. In some aspects, the controller multiplexer 560 may be controlled via a control signal from the controller 502 and/or a host (not shown) that indicates whether a write operation or a read operation is enabled.

In a write operation, the transmitter 520 is active such that components along the write path in the transmitter 520 are active for facilitating a data transfer to the NAND die 510. The transmitter 520 at the controller 502 includes an integrity information generator 506 to implement error detection or data integrity checking during transfer of data to a NAND die 510 on a TM DBI channel 508.

When the controller 502 is to write data (e.g., at least one byte of data) in the NAND die 510, the controller 502 may send the data through a TM data bus 504, and the data may then be transferred to the NAND die 510 on a TM data bus 516.

The integrity information generator 506 may generate data integrity information based on the data to be written.

Illustratively, the integrity information generator 506 includes a CRC generator 524 coupled to a CRC serializer 526 that is then coupled to a transmitter multiplexer 528.

In some aspects, for example, the CRC generator 524 may include a data integrity algorithm that outputs the data integrity information, such as CRC data. At the output of the CRC generator 524, the CRC data may include at least one byte of data. Illustratively, the CRC generator 524 may receive at least a portion of the data (e.g., at least one byte of data) as an input from the TM data bus 504, and the CRC generator 524 may generate and output CRC information as 2 bytes of data.

The CRC serializer 526 may receive the CRC information as input from the CRC generator 524 and serialize the CRC data from one or more bytes into multiple single bits in sequential order, of which each bit of CRC data corresponds to a byte of data transferred on the TM data bus 516.

The transmitter 520 also includes a DBI logic transmitter module 522. The DBI logic transmitter module 522 may generate and send DBI information to the NAND die 510 as part of a DBI scheme associated with the write operation.

The transmitter multiplexer 528 may be a combinational logic circuit that switches between the DBI path (consisting of the DBI logic transmitter module 522) and the data integrity path (consisting of components in the integrity information generator 506 at the controller 502). In some aspects, the transmitter multiplexer 528 may be controlled via a control signal from the controller 502 indicating whether the controller 502 and/or the storage device is operating in a DBI mode (to select the DBI path) or a data integrity protection mode (to select the data integrity path). In some aspects, the selection between the data integrity path and the DBI path may be implemented dynamically or statically on a per page or per section basis according to one or more factors, such as interface speed, power constraints, thermal constraints, device aging, target frequency, target integrity or line BER.

In the data integrity protection mode, the transmitter multiplexer 528 is switched to select the data integrity path such that the transmitter multiplexer 528 receives the data integration information as input from the CRC serializer 526. Otherwise, in the DBI mode, the transmitter multiplexer 528 is switched to the DBI path such that the DBI logic transmitter module 522 feeds DBI information as input to the transmitter multiplexer 528.

In some aspects, the controller multiplexer 560 receives the data integration information from the transmitter multiplexer 528 along the write path. In a write operation, the controller multiplexer 560 is switched to the write path and may output the data integrity information at a time similar to (or almost identical to) the data being output on the TM data bus 516 so that the data is transferred to the die 510 contemporaneously with the data integrity information.

In a read operation, the receiver 530 is active such that components along the read path in the receiver 530 are active for facilitating a data transfer from the NAND die 510 to the controller 502. The receiver 530 at the controller 502 includes an integrity information checker 512 to detect whether there is at least one error in at least one byte of data sent from the NAND die 510 to the controller 502 over the TM data bus 516 based on data integrity information sent from the NAND die 510 over the TM DBI channel 508.

When the controller 502 is to read data (e.g., at least one byte of data) from the NAND die 510, the NAND die 510 may send the data through the TM data bus interface 514, and the data may then be transferred to the controller 502 on the TM data bus 516 and received by the controller 502 via the TM data bus 504.

The integrity information checker 512 may check the data integrity information against the data that is read from the NAND die 510. Illustratively, the integrity information checker 512 includes a receiver demultiplexer 534 coupled to a CRC deserializer 536 that is then coupled to a CRC checker 538.

The receiver 530 at the controller 502 also includes a DBI logic receiver module 532. The DBI logic receiver module 532 may receive and process DBI information from the NAND die 510 as part of the DBI scheme associated with the read operation.

In some aspects, the controller multiplexer 560 receives the data integration information from the die multiplexer 570 at the NAND die 510 over the TM DBI channel 508. In a read operation, the controller multiplexer 560 is switched to the read path and may feed the data integrity information to the CRC deserializer 536. In some aspects, the data integrity information includes CRC data.

The receiver demultiplexer 534 may be a combinational logic circuit that switches between the DBI path (consisting of the DBI logic transmitter module 532) and the data integrity path (consisting of components in the integrity information checker 512 at the controller 502). In some aspects, the transmitter demultiplexer 534 may be controlled via a control signal from the controller 502 indicating whether the controller 502 and/or the storage device is operating in a DBI mode (to select the DBI path) or a data integrity protection mode (to select the data integrity path).

In the data integrity protection mode, the receiver demultiplexer 534 is switched to select the data integrity path such that the CRC deserializer 536 receives the data integration information as input. Otherwise, in the DBI mode, the receiver demultiplexer 534 is switched to the DBI path such that the DBI logic receiver module 532 receives DBI information as input.

The CRC deserializer 536 may receive the CRC data as input from the controller multiplexer 560 and deserialize the CRC data from multiple single bits arranged in sequential order into one or more bytes, of which each byte of CRC data corresponds to a subset of bytes of data (e.g., 8 bytes) transferred on the TM data bus 516. In some aspects, two bytes of CRC data may correspond to a block of data (e.g., 16 bytes). Without departing from the scope of the present disclosure, the number of CRC bytes that correspond to the number of data bytes may vary depending on implementation. The CRC deserializer 536 feeds the deserialized CRC data to the CRC checker 538.

Similar to the CRC generator 524, the CRC checker 538 may be configured with an algorithm with which the CRC checker 538 may detect for errors in the at least one byte of data transferred over the TM data bus 516. In some implementations, when the data integrity information includes a CRC bit or a CRC byte, the CRC checker 538 may include a CRC algorithm, which may be configured similarly to the CRC generator 524 (e.g., configured for calculating a checksum).

Subsequently, the CRC checker 538 may obtain the expected information as an output of the CRC algorithm, and may compare the expected information with the data integrity information (e.g., serialized CRC data). If the CRC checker 538 determines that the expected information matches the data integrity information, then the CRC checker 538 may determine that no errors occurred in the data transfer of the read operation. If the CRC checker 538 determines that the expected information does not match the data integrity information, then the CRC checker 538 may determine that an error occurred in the data transfer of the read operation. In response to detecting the error in the data transfer based on the data integrity information, then the controller 502 may store a record of the read error in a local register for subsequent access via the TM data bus 504 with a "check read" command or a "status read" command.

As shown in FIG. 5, the NAND die 510 includes a receiver 540 and a transmitter 550. The NAND die 510 also includes a die multiplexer 570 that may be a combinational logic circuit that switches between a write path to the receiver 540 or a read path from the transmitter 550. In some aspects, the die multiplexer 570 may be controlled via a control signal from the NAND die 510 and/or the controller 502 that indicates whether a write operation or a read operation is enabled.

In a read operation, the transmitter 550 is active such that components along the read path in the transmitter 550 are active for facilitating a data transfer from the NAND die 510 to the controller 502.

The transmitter 550 at the NAND die 510 includes an integrity information generator 506 to implement error detection or data integrity checking during transfer of data to the controller 502 from the NAND die 510 on the TM DBI channel 508.

When the controller 502 is to read data (e.g., at least one byte of data) from the NAND die 510, the NAND die 510 may send the data through a TM data bus interface 514, and the data may then be transferred to the controller 502 on the TM data bus 516.

The integrity information generator 506 may generate data integrity information based on the read data. Illustratively, the integrity information generator 506 includes a CRC generator 554 coupled to a CRC serializer 556 that is then coupled to a transmitter multiplexer 558.

Similar to the CRC generator 524, the CRC generator 554 may include a data integrity algorithm that outputs the data integrity information, such as CRC data. At the output of the CRC generator 554, the CRC data may include at least one byte of data. Illustratively, the CRC generator 554 may receive at least a portion of the data (e.g., at least one byte of data) as an input from the TM data bus interface 514, and the CRC generator 554 may generate and output CRC information as 2 bytes of data.

The CRC serializer 556 may receive the CRC information as input from the CRC generator 554 and serialize the CRC data from one or more bytes into multiple single bits in sequential order, of which each bit of CRC data corresponds to a byte of data transferred on the TM data bus 516.

The transmitter 550 also includes a DBI logic transmitter module 552. The DBI logic transmitter module 552 may generate and send DBI information to the controller 502 as part of a DBI scheme associated with the read operation.

The transmitter multiplexer 558 may be a combinational logic circuit that switches between the DBI path (consisting of the DBI logic transmitter module 552) and the data integrity path (consisting of components in the integrity information generator 506 at the NAND die 510). In some aspects, the transmitter multiplexer 558 may be controlled via a control signal from the NAND die 510 and/or the controller 502 indicating whether the controller 502 and/or the storage device is operating in the DBI mode (to select the DBI path) or the data integrity protection mode (to select the data integrity path).

The die multiplexer 570 receives the data integration information from the transmitter multiplexer 558 along the read path. In a read operation, the die multiplexer 570 is switched to the read path and may output the data integrity information at a time similar to (or almost identical to) the data being output on the TM data bus 516 so that the data is transferred to the controller 502 contemporaneously with the data integrity information.

In a write operation, the receiver 540 at the NAND die 510 is active such that components along the write path in the receiver 540 are active for facilitating a data transfer to the NAND die 510. The receiver 540 includes an integrity information checker 512 to detect whether there is at least one error in at least one byte of data sent from the controller 502 to the NAND die 510 over the TM data bus 516 based on data integrity information sent from the controller 502 over the TM DBI channel 508.

When the controller 502 is to write data (e.g., at least one byte of data) to the NAND die 510, the controller 502 may send the data through the TM data bus interface 514, and the data may then be transferred to the NAND die 510 on the TM data bus 516 and received by the NAND die 510 via the TM data bus interface 514.

The integrity information checker 512 may check the data integrity information against the data that is to be written to the NAND die 510. Illustratively, the integrity information checker 512 includes a receiver demultiplexer 544 coupled to a CRC deserializer 546 that is then coupled to a CRC checker 548.

The receiver 540 at the controller 502 also includes a DBI logic receiver module 542. The DBI logic receiver module 542 may receive and process DBI information from the controller 502 as part of the DBI scheme associated with the write operation.

In some aspects, the die multiplexer 570 receives the data integration information from the controller multiplexer 560 over the TM DBI channel 508. In a write operation, the die multiplexer 570 is switched to the write path and may feed the data integrity information to the receiver demultiplexer 544. In some aspects, the data integrity information includes CRC data.

The receiver demultiplexer 544 may be a combinational logic circuit that switches between the DBI path (consisting of the DBI logic transmitter module 542) and the data integrity path (consisting of components in the integrity information checker 512 at the NAND die 510). In some aspects, the receiver demultiplexer 544 may be controlled via a control signal from the controller 502 and/or the NAND die 510 indicating whether the controller 502 and/or the storage device is operating in a DBI mode (to select the DBI path) or a data integrity protection mode (to select the data integrity path).

In the data integrity protection mode, the receiver demultiplexer 544 is switched to select the data integrity path such that the CRC deserializer 546 receives the data integration information as input from the receiver demultiplexer 544. Otherwise, in the DBI mode, the receiver demultiplexer 544 is switched to the DBI path such that the DBI logic receiver module 542 receives DBI information as input from the receiver demultiplexer 544.

The CRC deserializer 546 may deserialize the CRC data from multiple single bits arranged in sequential order into one or more bytes, of which each byte of CRC data corresponds to a subset of bytes of data (e.g., 8 bytes) transferred on the TM data bus 516. In some aspects, two bytes of CRC data may correspond to a block of data (e.g., 16 bytes). Without departing from the scope of the present disclosure, the number of CRC bytes that correspond to the number of data bytes may vary depending on implementation. The CRC deserializer 546 feeds the deserialized CRC data to the CRC checker 548.

Similar to the CRC generator 554, the CRC checker 548 may be configured with an algorithm with which the CRC checker 548 may detect for errors in the at least one byte of data transferred over the TM data bus 516. In some implementations, when the data integrity information includes a CRC bit or a CRC byte, the CRC checker 548 may include a CRC algorithm, which may be configured similarly to the CRC generator 554 (e.g., configured for calculating a checksum).

Subsequently, the CRC checker 548 may obtain the expected information as an output of the CRC algorithm, and may compare the expected information with the data integrity information (e.g., serialized CRC data). If the CRC checker 548 determines that the expected information matches the data integrity information, then the CRC checker 548 may determine that no errors occurred in the data transfer of the write operation. If the CRC checker 548 determines that the expected information does not match the data integrity information, then the CRC checker 548 may determine that an error occurred in the data transfer of the write operation. In response to detecting the error in the data transfer based on the data integrity information, then the NAND die 510 may store a record of the write error in a local register for subsequent access via the TM data bus 504 with a "check write" command or a "program" command.

Figure 6:
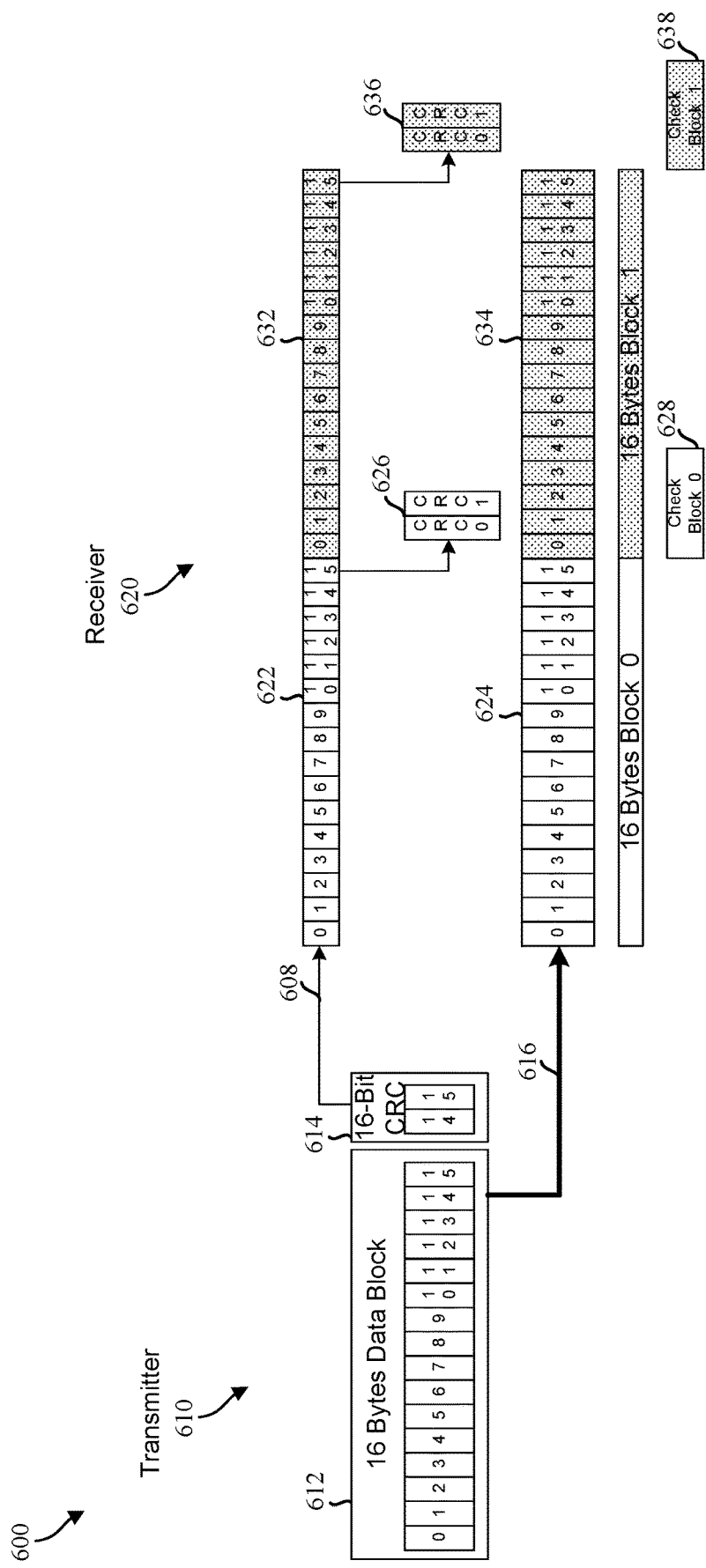
FIG. 6 is a conceptual diagram illustrating an example of a timing diagram for transferring data integrity information during transfer of data bytes between a transmitter and a receiver for write operations and read operations.

FIG. 6 is a conceptual diagram illustrating an example 600 of a timing diagram for transferring data integrity information during transfer of data bytes between a transmitter 610 and a receiver 620 for write operations and read operations. In the context of FIG. 5, the transmitter 610 may be implemented as the controller 502 and the receiver 620 may be implemented as the NAND die 510 for a write operation, whereas the transmitter 610 may be implemented as the NAND die 510 and the receiver 620 may be implemented as the controller 502 for a read operation.

As illustrated, the data path between the transmitter 610 and the receiver 620 may be connected to a TM data bus 616, and the data integrity path between the transmitter 610 and the receiver 620 may be connected to a TM DBI channel 608.

When a controller executes a write operation to write data in a die, the controller may transfer (or send) the data to the die on a write channel. Illustratively, the transmitter 610 may execute a write operation to write data at the receiver 620 by transferring a block of data 612 (containing 16 bytes of data) to the receiver 620 over the TM data bus 616. Correspondingly, the die may receive the data from the controller on the write channel. Illustratively, the receiver 620 receives a first block of data 624 (denoted as "Block_0") transferred on the TM data bus 616 and buffers each byte of data of the first block of data 624 into one or more data buffers.

Conversely, when the controller 502 executes a read operation to read data in the die, the die may transfer (or send) the data to the controller on a read channel. Illustratively, the transmitter 610 may execute a read operation to read data from memory and transferring a block of data 612 (containing 16 bytes of data) to the receiver 620 over the TM data bus 616. Correspondingly, the controller may receive the data from the die on the read channel. Illustratively, the receiver 620 receives a first block of data 624 (denoted as "Block_0") transferred on the TM data bus 616 and buffers each byte of data of the first block of data 624 into one or more data buffers.

During transfer of either a write operation or a read operation, data integrity information 614 may be serialized into a data integrity information bitstream 622 across the TM DBI channel 608, whereas the data bytes may include eight bits in parallel across the TM data bus 616. In some implementations, the data integrity information bitstream 622 may be a single bit that is toggled from across the TM DBI channel 608 at the same clock rate as the first block of data 624 across the TM data bus 616. For example, during transfer of a write operation, the transmitter 610 may toggle (e.g., to either a 1 bit or a 0 bit) the signal across the TM DBI channel 608 based on each bit of the data integrity information bitstream 622 that corresponds to a respective data byte of the first block of data 624. In another example, during transfer of a read operation, the transmitter 610 may toggle (e.g., to either a 1 bit or a 0 bit) the signal across the TM DBI channel 608 based on each bit of the data integrity information bitstream 622 that corresponds to a respective data byte of the first block of data 624.

Correspondingly, the receiver 620 may receive data bytes 0, 1, . . . , 14, 15 via the TM data bus 616, and contemporaneous with a respective one of the data bytes 0, 1, . . . , 14, 15, the receiver 620 may also receive respective data integrity information bits 0, 1, . . . , 14, 15 via the TM DBI channel 608. In other words, in a window in which data byte 0 is received across the bus on TM data bus 616, data integrity information bit 0 is also received across the bus on the TM DBI channel 608. In some implementations, the receiver 620 may deserialize the received data integrity information bits 622 into one or more bytes of data integrity information 626 (e.g., denoted as CRC0 and CRC1). In some aspects, each of the deserialized data integrity information bits 622 corresponds to a CRC bit.

In some implementations, as the receiver 620 contemporaneously receives each of the data bytes 0, 1, . . . , 14, 15 at the TM data bus 616 and each of the data integrity information bits 0, 1, . . . , 14, 15 at the TM DBI channel 608, the receiver 620 may perform error detection for each of the data bytes 0, 1, . . . , 14, 15 based on a respective data integrity information bit 0, 1, . . . , 14, 15. For example, when the receiver 620 receives data byte 0 on the TM data bus 616 and CRC bit 0 on the TM DBI channel 608, the receiver 620 may generate (on-the-fly) an expected information based on data byte 0. The receiver 620 may then check the first block of data 624 (denoted as "Check Block_0") by comparing the expected information with data byte 0 to detect whether any errors are present in data byte 0. If no errors are detected (e.g., if the expected information is determined to match CRC bit 0), then the receiver 620 may program data byte 0 in a die at the receiver 620 for a write operation. However, if the receiver 620 detects an error (e.g., if the expected information is determined to not match CRC bit 0), then the receiver 620 may flag the detected error in a register accessible to the controller 602 via the TM data bus 616. In a further example, the receiver 620 may receive a second block of data 634 (denoted as "Block_1") contemporaneously with data integrity information bits 632. The receiver 620 may then deserialize the data integrity information bits 632 into multiple bytes of data integrity information 636. The receiver 620 may then check the second block of data 634 against the data integrity information bits 632 (denoted as "Check Block_1").

Figure 7:
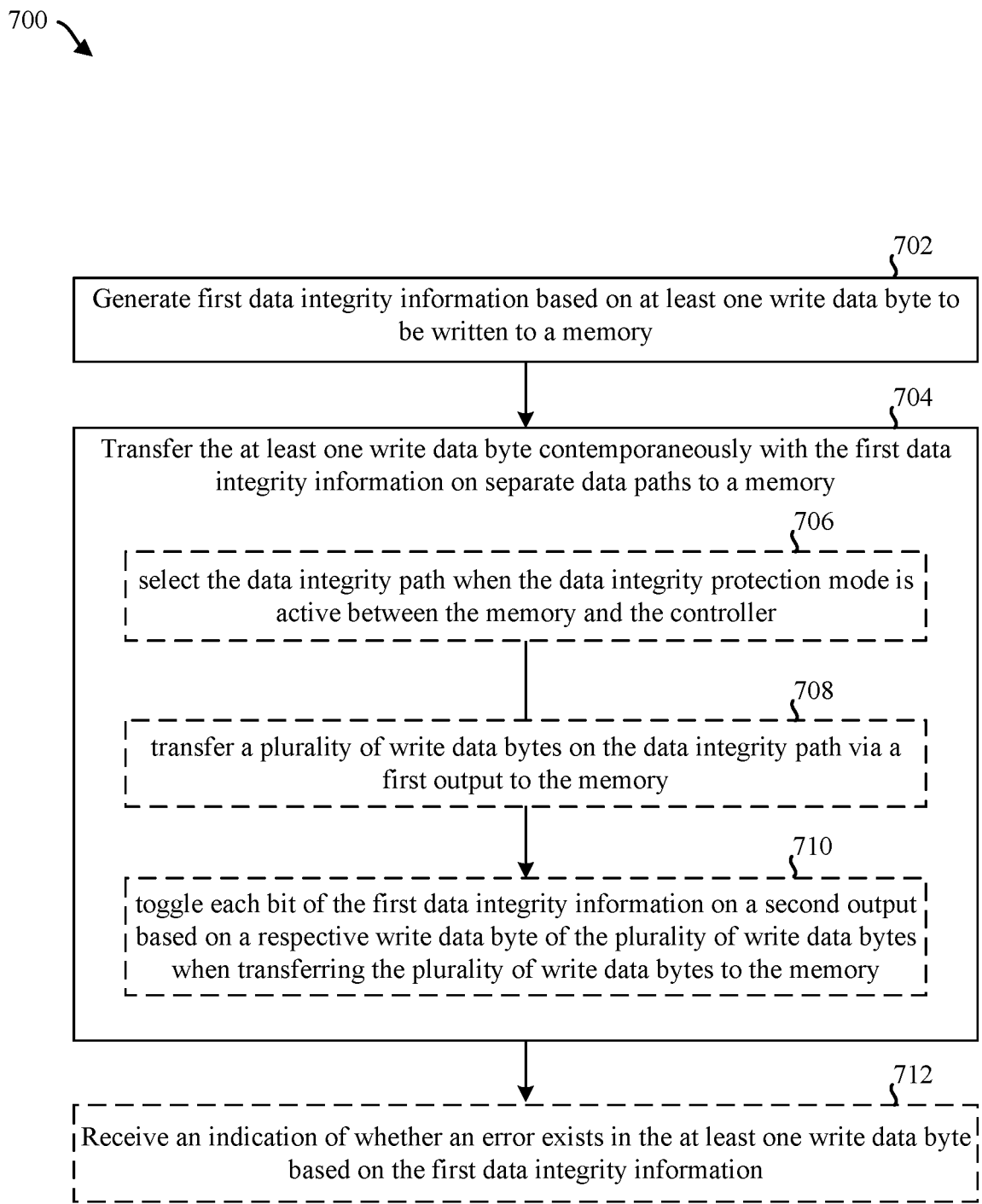
FIG. 7 is a flowchart illustrating a method for generating data integrity information for bytes of data transferred during a memory operation, which may be performed by the storage device of FIG. 1.

FIG. 7 is a flowchart 700 illustrating a method for generating data integrity information for bytes of data transferred during a memory operation. For example, the method may be performed in a storage device, such as the storage device 102 illustrated in FIG. 1, a storage device including the controller 302 illustrated in FIG. 3, and/or a storage device including the controller 402 illustrated in FIG. 4.

Each of the operations in the method can be controlled using a controller (e.g., the controller 123, 302, 402, 502) or by some other suitable means. The memory operation may be a write operation in some aspects, or the memory operation may be a read operation in other aspects.

As represented by block 702, the controller may generate first data integrity information based on at least one write data byte to be written to a memory. For example, referring to FIG. 1, the controller 123 may generate the first data integrity information based on at least one write data byte to be written to a respective one of the memory locations 112.

As represented by block 704, the controller may transfer the at least one write data byte contemporaneously with the first data integrity information on separate data paths to the memory. The first data integrity information may be transferred on a TM DBI channel to the memory while the write data bytes may be transferred on a TM data bus to the memory. For example, referring to FIG. 1, the controller 123 may transfer the at least one write data byte to the respective one of the memory locations 112 via the TM data bus, and the first data integrity information may be transferred on the TM DBI channel to the respective one of the memory locations 112.

In some implementations, block 704 may include block 706, block 708 and block 710. As represented by block 706, the controller may select the data integrity path when the data integrity protection mode is active between the memory and the controller. For example, referring to FIG. 1, the controller 123 may select the data integrity path when the data integrity protection mode is active between the memory locations 112 and the controller 123.

As represented by block 708, the controller may transfer a plurality of write data bytes on a first output to the memory. For example, referring to FIG. 1, the controller 123 may transfer a plurality of write data bytes on the TM data bus output to the respective one of the memory locations 112.

As represented by block 710, the controller may toggle each bit of the first data integrity information on a second output based on a respective write data byte of the plurality of write data bytes when transferring the plurality of write data bytes to the memory. For example, referring to FIG. 1, the controller 123 may toggle each bit of the first data integrity information on a TM DBI channel output based on a respective write data byte of the plurality of write data bytes when transferring the plurality of write data bytes to the respective one of the memory locations 112.

As represented by block 712, the controller may receive an indication of whether an error exists in the at least one write data byte based on the first data integrity information. For example, referring to FIG. 1, the controller 123 may receive an indication of whether an error exists in the at least one write data byte based on the first data integrity information in response to transferring the at least one write data byte and the first data integrity information to the respective one of the memory locations 112.

Figure 8:
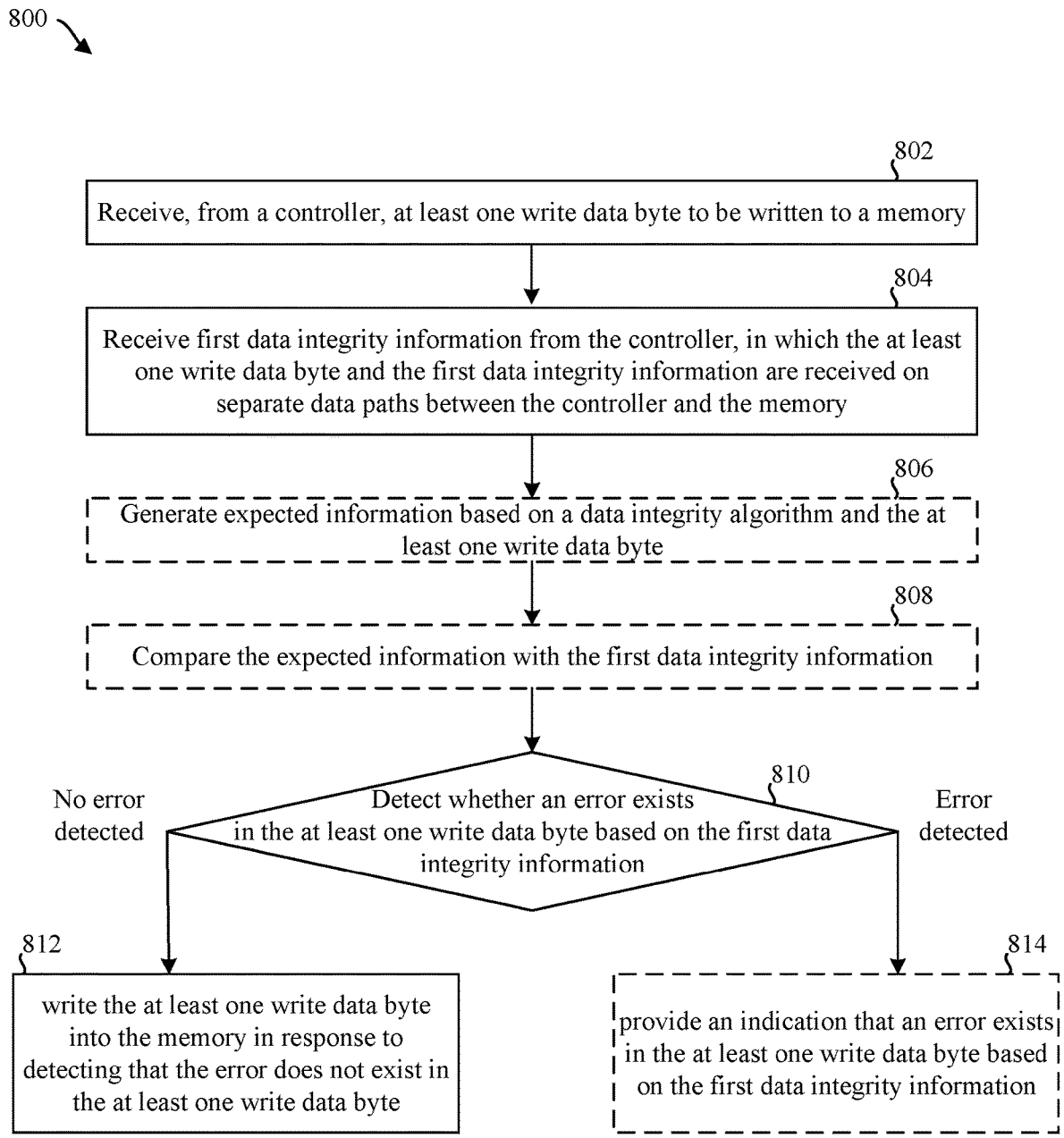
FIG. 8 is a flowchart illustrating a method for checking data integrity information for bytes of data transferred during a memory operation, which may be performed by the storage device of FIG. 1.

FIG. 8 illustrates an example flowchart 800 of a method for checking data integrity information for bytes of data transferred during a memory operation. For example, the method may be performed in a storage device, such as the storage device 102 illustrated in FIG. 1, a storage device including the die 310 illustrated in FIG. 3, and/or a storage device including the die 410 illustrated in FIG. 4. Each of the operations in the method can be controlled using a data integrity check circuit (e.g., the data integrity circuit(s) 115), die (e.g., the die 310, 410, 510), or by some other suitable means. The memory operation may be a write operation in some aspects, or the memory operation may be a read operation in other aspects.

As represented by block 802, the data integrity check circuit may receive, from a controller, receive at least one write data byte to be written to the memory. For example, referring to FIG. 1, the data integrity circuit(s) 115 may receive, from the controller 123, an at least one write data byte to be written to a respective one of the memory locations 112.

As represented by block 804, the data integrity check circuit may receive first data integrity information from the controller, in which the at least one write data byte and the first data integrity information are received on separate data paths between the controller and the memory. For example, referring to FIG. 1, the data integrity circuit(s) 115 may receive the first data integrity information from the controller 123 via a TM DBI input that is on a separate data path than the at least one write data byte that is received via a TM data bus input.

As represented by block 806, the data integrity check circuit may generate an expected information based on a data integrity algorithm and the at least one write data byte. For example, referring to FIG. 1, the data integrity circuit(s) 115 may generate expected information based on the data integrity algorithm and the at least one write data byte.

As represented by block 808, the data integrity check circuit may compare the expected information with the first data integrity information. For example, referring to FIG. 1, the data integrity circuit(s) 115 may compare the expected information with the first data integrity information.

As represented by block 810, the data integrity check circuit may detect whether an error exists in the at least one write data byte based on the first data integrity information. For example, referring to FIG. 1, the data integrity circuit(s) 115 may detect whether an error exists in the at least one write data byte based on the first data integrity information.

If no error is detected, then as represented by block 812, the data integrity check circuit may write the at least one write data byte to the memory in response to detecting that the error does not exist in the at least one write data byte. For example, referring to FIG. 1, the data integrity circuit(s) 115 may write the at least one write data byte to one of the memory locations 112 in response to detecting that the error does not exist in the at least one write data byte.

If an error is detected, then as represented by block 814, the data integrity check circuit may provide an indication that an error exists in the at least one write data byte. In one implementation, the indication may be a bit or other signal sent to a "status read" register with a "check write" command or as a "program" command. In another implementation, the indication may include multiple bits (or even bytes)—e.g., the indication may generate a report by counting the number of detected errors on a page transmission. For example, referring to FIG. 1, the data integrity circuit(s) 115 may provide an indication that an error exists in the at least one write data byte. In some aspects, the controller 123 receive the indication by accessing the status read register with the flagged error.

Various implementations of the present disclosure describe data integrity information that is transferred with data during data transfer of a write operation, and the data integrity information provides a mechanism for detecting errors and checking data integrity during data transfer. In some examples, the data integrity information may be transferred on a DBI pin or DBI output, and correspondingly received or detected on a DBI pin or DBI input. By reusing (or repurposing) the DBI pins or DBI output/input, additional pins or output/inputs may be unnecessary, and such error detection and data integrity checking using data integrity information may be implemented using existing interfaces and/or buses.

The various aspects of this disclosure are provided to enable one of ordinary skill in the art to practice the present disclosure. Various modifications to exemplary implementations presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary implementations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
   a memory; and
   a controller coupled to the memory and configured to:
      generate first data integrity information based on at least one write data byte to be written to the memory, wherein the first data integrity information comprises cyclic redundancy check (CRC) information generated based on the at least one write data byte, wherein the CRC information comprises a plurality of CRC bits;
      transfer a plurality of write data bytes on a first output to the memory;
      toggle each CRC bit of the plurality of CRC bits on a second output based on a respective write data byte of the plurality of write data bytes when transferring the plurality of write data bytes to the memory; and
      transfer the at least one write data byte contemporaneously with the first data integrity information on separate data paths to the memory.

2. The storage device of claim 1, wherein the second output comprises a data bus inversion (DBI) output.

3. The storage device of claim 1, wherein the controller is further configured to:
   receive an indication of whether an error exists in the at least one write data byte based on the first data integrity information.

4. The storage device of claim 1, wherein the controller comprises:
   a data integrity check circuit configured to:
      receive at least one read data byte that is read from the memory;
      receive second data integrity information from the memory; and
      detect whether an error exists in the at least one read data byte based on the second data integrity information.

5. The storage device of claim 2, wherein the controller is further configured to:
   switch between a data bus inversion (DBI) path and a data integrity path to the memory based on whether a data integrity protection mode is active between the memory and the controller.

6. The storage device of claim 5, wherein the controller is further configured to:
   select the data integrity path when the data integrity protection mode is active between the memory and the controller, wherein the first data integrity information is transferred on the data integrity path to the memory.

7. The storage device of claim 5, wherein the controller is further configured to:
   select the DBI path when the data integrity protection mode is not active between the memory and the controller; and
   transfer a DBI signal on the DBI path via the second output to the memory.

8. The storage device of claim 4, wherein the data integrity check circuit is further configured to:
   generate expected information based on a data integrity algorithm and the at least one read data byte; and
   compare the expected information with the second data integrity information,
   wherein the detection of whether the error exists is further based on the comparison of the expected information with the second data integrity information.

9. A storage device, comprising:
   a controller; and
   a memory coupled to the controller and configured to:
      receive a plurality of write data bytes on a first input from the controller, wherein the plurality of write data bytes include a first write data byte to be written to the memory;
      receive first data integrity information from the controller, wherein the first write data byte and the first data integrity information are received on separate data paths between the controller and the memory, wherein the first data integrity information comprises cyclic redundancy check (CRC) information generated based on the first write data byte, and wherein the CRC information comprises a plurality of CRC bits;
      receive each CRC bit of the plurality of CRC bits toggled on a second input based on a respective write data byte of the plurality of write data bytes when the plurality of write data bytes are received from the controller;
      detect whether an error exists in the first write data byte based on the first data integrity information; and
      write the first write data byte into the memory in response to detecting that the error does not exist in the first write data byte.

10. The storage device of claim 9, wherein the second input comprises a data bus inversion (DBI) input, wherein the memory is further configured to:
    switch between a data bus inversion (DBI) path and a data integrity path within the memory based on whether a data integrity protection mode is active between the memory and the controller.

11. The storage device of claim 9, wherein the memory is further configured to:
    provide an indication of whether an error exists in the first write data byte based on the first data integrity information.

12. The storage device of claim 9, wherein the memory comprises:
- a data integrity generator circuit configured to:
  - generate second data integrity information based on at least one read data byte that is read from the memory; and
  - transfer the at least one read data byte contemporaneously with the second data integrity information on separate data paths to the controller.

13. The storage device of claim 9, wherein the memory comprises:
- a data integrity check circuit configured to:
  - generate expected information based on a data integrity algorithm and the first write data byte; and
  - compare the expected information with the first data integrity information,
  - wherein the detection of whether the error exists is further based on the comparison of the expected information with the first data integrity information.

14. The storage device of claim 10, wherein the memory is further configured to:
- select the data integrity path when the data integrity protection mode is active between the memory and the controller, wherein the first data integrity information is transferred on the data integrity path from the controller.

15. The storage device of claim 10, wherein the memory is further configured to:
- select the DBI path when the data integrity protection mode is not active between the memory and the controller; and
- receive a DBI signal on the DBI path via the second input at the memory.

16. An apparatus, comprising:
- a memory;
- a data integrity generator circuit connected to the memory and configured to:
  - generate first data integrity information based on at least one write data byte to be written to the memory, wherein the first data integrity information comprises cyclic redundancy check (CRC) information generated based on the at least one write data byte, wherein the CRC information comprises a plurality of CRC bits;
  - transfer a plurality of write data bytes on a first output to the memory; and
  - toggle each CRC bit of the plurality of CRC bits on a second output based on a respective write data byte of the plurality of write data bytes when transferring the plurality of write data bytes to the memory; and
- a data integrity check circuit connected to the memory and configured to:
  - receive at least one read data byte that is read from the memory,
  - receive second data integrity information from the memory, and
  - detect whether an error exists in the at least one read data byte based on the second data integrity information.

* * * * *